United States Patent
Zhao

(10) Patent No.: US 10,587,533 B2
(45) Date of Patent: Mar. 10, 2020

(54) FACILITATING MANAGEMENT OF RESOURCES

(71) Applicant: EMC Corporation, Hopkinton, MA (US)

(72) Inventor: Tom Xiaodong Zhao, Chendgu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 14/669,900

(22) Filed: Mar. 26, 2015

(65) Prior Publication Data

US 2015/0281124 A1    Oct. 1, 2015

(30) Foreign Application Priority Data

Mar. 28, 2014   (CN) .......................... 2014 1 0135626

(51) Int. Cl.
    *H04L 12/911*    (2013.01)
    *H04L 29/14*     (2006.01)
    *H04L 12/24*     (2006.01)

(52) U.S. Cl.
    CPC ............ *H04L 47/822* (2013.01); *H04L 41/16* (2013.01); *H04L 41/5051* (2013.01); *H04L 41/5058* (2013.01); *H04L 47/746* (2013.01); *H04L 69/40* (2013.01)

(58) Field of Classification Search
    CPC .............. H04L 47/822; H04L 41/5051; H04L 41/5058; H04L 41/16; H04L 69/40; H04L 47/746
    USPC ....................................................... 709/226
    See application file for complete search history.

(56) References Cited

U.S. PATENT DOCUMENTS

| | | | | |
|---|---|---|---|---|
| 5,386,551 A * | 1/1995 | Chikira | ................... | G06F 11/22 714/46 |
| 8,631,099 B2 * | 1/2014 | Morgan | ................ | G06F 9/5088 709/203 |
| 8,694,639 B1 * | 4/2014 | Vermeulen | ............ | G06F 9/5011 709/226 |
| 8,825,858 B1 * | 9/2014 | Atchity | ................. | H04L 47/788 709/224 |
| 8,832,219 B2 * | 9/2014 | Morgan | .............. | H04L 12/1453 709/203 |
| 8,954,592 B1 * | 2/2015 | Cormie | ................. | H04L 47/783 709/225 |
| 9,385,934 B2 * | 7/2016 | Baughman | .............. | H04L 43/16 |
| 9,720,763 B2 * | 8/2017 | Rajasekharan | ..... | G06F 11/0793 |

(Continued)

FOREIGN PATENT DOCUMENTS

CN           101019120 A      8/2007

*Primary Examiner* — Michael Won

(74) *Attorney, Agent, or Firm* — BainwoodHuang

(57) ABSTRACT

Embodiments of the present disclosure provide an apparatus and method for facilitating management of resources. The apparatus configured to collect all software and hardware resources available to a user; store information associated with the collected resources; present the information associated with the collected resources to the user and receive a resource allocation request from the user; and configure resources based on the resource allocation request; allocate the configured resources to the user. By means of the present disclosure, it is possible to achieve one-stop-shop resource query, fully automated resource configuration, reduced costs for maintenance and/or precise instructions for resource expansion.

20 Claims, 4 Drawing Sheets

(56) References Cited

U.S. PATENT DOCUMENTS

| | | | |
|---|---|---|---|
| 2002/0087665 A1* | 7/2002 | Marshall | H04L 12/24 709/220 |
| 2002/0147611 A1* | 10/2002 | Greene | G06Q 10/063112 705/1.1 |
| 2002/0173984 A1* | 11/2002 | Robertson | G06Q 10/10 709/220 |
| 2003/0046396 A1* | 3/2003 | Richter | G06F 9/505 709/226 |
| 2006/0080319 A1* | 4/2006 | Hickman | G06F 11/2023 |
| 2007/0086433 A1* | 4/2007 | Cunetto | H04L 12/58 370/352 |
| 2009/0106278 A1* | 4/2009 | Ramacher | G06F 11/0748 |
| 2010/0017515 A1* | 1/2010 | Nishiguchi | G06F 9/5077 709/226 |
| 2010/0107172 A1* | 4/2010 | Calinescu | G06F 9/5061 718/104 |
| 2012/0072487 A1* | 3/2012 | Binyamin | H04L 67/16 709/203 |
| 2012/0117241 A1* | 5/2012 | Witt | G06F 17/30 709/226 |
| 2012/0124211 A1* | 5/2012 | Kampas | G06F 9/50 709/226 |
| 2012/0131194 A1* | 5/2012 | Morgan | G06F 9/5072 709/226 |
| 2012/0137002 A1* | 5/2012 | Ferris | G06F 9/5072 709/226 |
| 2012/0221683 A1* | 8/2012 | Ferris | H04L 12/4641 709/218 |
| 2012/0226808 A1* | 9/2012 | Morgan | G06F 9/5072 709/226 |
| 2012/0233668 A1* | 9/2012 | Leafe | G06F 9/5022 726/4 |
| 2012/0303740 A1* | 11/2012 | Ferris | G06F 17/30194 709/217 |
| 2012/0303814 A1* | 11/2012 | Ferris | G06Q 10/06 709/226 |
| 2012/0311153 A1* | 12/2012 | Morgan | H04L 12/00 709/226 |
| 2014/0006626 A1* | 1/2014 | Breiter | H04L 41/0806 709/226 |
| 2014/0006627 A1* | 1/2014 | Arwe | H04L 29/08468 709/226 |
| 2014/0033200 A1* | 1/2014 | Tompkins | H04L 63/061 718/1 |
| 2014/0289413 A1* | 9/2014 | Chan | G06F 9/54 709/226 |
| 2015/0195182 A1* | 7/2015 | Mathur | H04L 43/50 714/27 |
| 2015/0263976 A1* | 9/2015 | Tsukernik | H04L 47/70 709/226 |
| 2015/0365370 A1* | 12/2015 | Gvildys | H04L 51/30 709/206 |
| 2016/0028649 A1* | 1/2016 | Herington | G06F 1/3203 709/226 |
| 2018/0316608 A1* | 11/2018 | Dowlatkhah | H04W 76/10 |

* cited by examiner

FACILITATING MANAGEMENT OF RESOURCES

RELATED APPLICATION

This application claims priority from Chinese Patent Application Number CN201410135626.3 filed on Mar. 28, 2014 entitled "APPARATUS AND METHOD FOR FACILITATING MANAGING OF RESOURCES" the content and teachings of which is herein incorporated by reference in its entirety.

FIELD OF THE INVENTION

Embodiments of the present disclosure relate to the field of resource management.

BACKGROUND

Nowadays some large IT enterprises usually have a plurality of research and development centers distributed around the world. Taking maintenance costs into consideration, for example, these large IT enterprises will put research and development resources needed by research and development centers under centralized management and maintenance. There is a need for an efficient way to manage lab resources.

SUMMARY

The present disclosure provides a solution for managing, maintaining and sharing devices more efficiently.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

Throughout the figures, the same or corresponding numerals refer to the same or corresponding parts.

DETAILED DESCRIPTION

Figure 1:
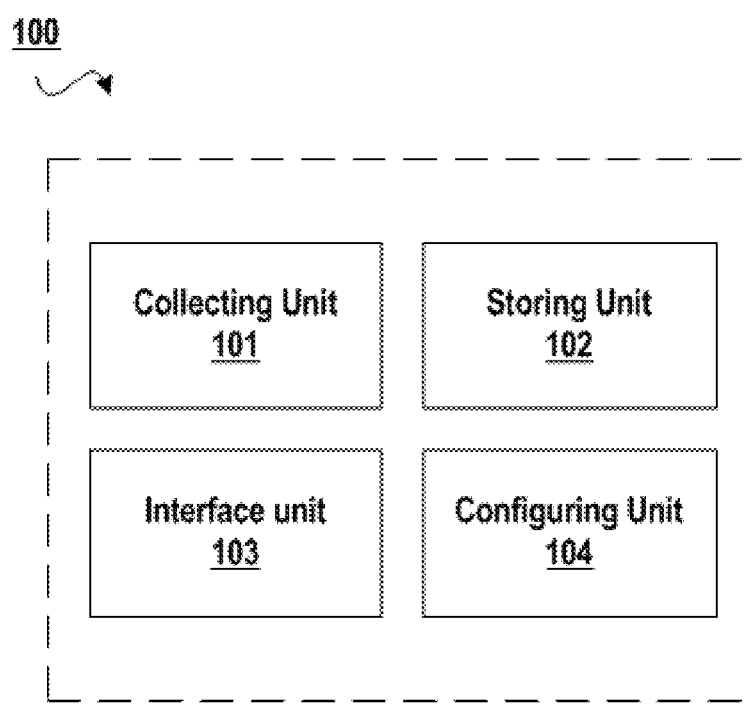
FIG. 1 shows a block diagram of an apparatus 100 for facilitating management of resources according to one exemplary embodiment of the present disclosure.

Hereinafter, principles and spirit of the present disclosure will be described with reference to several exemplary embodiments shown in the drawings various. It should be understood that provision of these embodiments is only to enable those skilled in the art to better understand and further implement the present disclosure but not to limit the scope of the present disclosure in any manner.

Typically, an enterprise may establish a research and development lab somewhere and at some place, organize and manage research and development resources that may be needed by some given research and development centers in the research and development lab. Conventionally, Research and development resources in the research and development lab may also be referred to as "lab resources". Generally, these given research and development centers have to remotely access and use the lab resources. In addition, typically the lab resources are usually allocated to different business units and research and development teams. Therefore, in general the enterprise is confronted with a challenge of managing and maintaining lab resources that are allocated to different business units or research and development teams, so as to enable sharing of the lab resources across units and/or teams.

Typically, each business unit manages their own lab resources and may maintain a list of their own resources. Generally, most of lists of the resources are manually created and perhaps are not updated in time. Therefore, in general, it is difficult to query all available lab resources in time, let alone achieve the resource usage tracking, remote reservation and sharing of the resources across units.

Again, typically if the above given research and development centers want to remotely use the lab resources, they may have to request administrators of the lab resources to manually configure the needed resources according to their research and development demands. However, in general, where the administrators delay responding, requesters can hardly get desired resources in time.

Again, typically, most lab resource maintenance work is done manually, including hardware health check, service package installation, driver and firmware updates, damaged component identification and the like, which may lead to a high cost of maintenance.

In General, since there may be no efficient way to track the lab resource usage, there may not be much real historical resource usage data which administrators may refer to when planning expansion of the lab resources. Generally then the expansion of the lab resources usually depends on administrators' experience.

In a first aspect, embodiments of the present disclosure provide an apparatus for facilitating management of resources. The apparatus may comprise: a collecting unit configured to collect all software and hardware resources available to a user; a storing unit configured to store information associated with the collected resources; an interface unit configured to present the information associated with the collected resources to the user and receive a resource allocation request from the user; and a configuring unit configured to configure the requested resources based on the resource allocation request; wherein the interface unit is further configured to allocate the configured resources to the user. In an alternate embodiment, the collecting unit, the storing unit, the interface unit and the configuring unit may be combined into a single facilitating unit, which is configured to collectively perform the tasks of each of these units in an order manner to facilitate management of resources.

In a second aspect, embodiments of the present disclosure provide a method for facilitating management of resources. The method may comprise: collecting all software and hardware resources available to a user; storing information associated with the collected resources; presenting the information associated with the collected resources to the user; receiving a resource allocation request from the user; configuring the requested resources based on the resource allocation request; and allocating the configured resources to the user.

In a third aspect, embodiments of the present disclosure provide a computer program product for facilitating management of resources. The computer program product may be tangibly stored on a non-transient computer-readable medium and comprise machine executable instructions which, when executed, cause the machine to perform steps of the method in the first aspect.

The embodiments of the present disclosure have at least one of benefits listed below.

a. One-Stop-Shop Resource Query—With the solution of the present disclosure, users may be able to query real time and consolidated hardware/software lab resource information via the interface unit, view resource states, request resource allocation and release resources via the interface unit.

b. Fully Automated Resource Configuration—With the solution of the present disclosure, resources requested by a remote user will be configured automatically based on the user's requirements, and no local intervention by lab administrators may be required any more, e.g., creating zones and mapping LUNs. Once requested resources are configured, they may be allocated to the user.

c. Reduced Cost for Maintenance—With the solution of the present disclosure, most of the resource maintenance operations may be done while resources are collected, including hardware health check, service package installation, driver and firmware updates, identifying and reporting bad components, etc.

d. Precise Instructions for Resource Expansion—With the solution of the present disclosure, all resources usage data may be recorded, collected and analyzed, e.g., a usage rate of the resources, vacancy windows of the resources, a shortage rate of the resources, etc. The data may be used to plan and optimize expansion of lab resources.

With reference to FIG. 1 first, it shows a block diagram of an apparatus 100 for facilitating management of resources according to one exemplary embodiment of the present disclosure.

As shown in FIG. 1, apparatus 100 comprises a collecting unit 101, a storing unit 102, an interface unit 103 and a configuring unit 104. Each of these individual units may be combined into a single facilitating unit (not shown in the Fig.), wherein the facilitating unit is configured to collectively perform the tasks of each of the individual units in an ordered manner to facilitate management of resources as disclosed below.

Collecting unit 101 is configured to collect all software and hardware resources available to users. As described above, in order to achieve centralized management and maintenance of resources, an IT enterprise may establish a research and development lab somewhere and are some place, organize and manage research and development resources needed by some of plural research and development centers in the lab. The research and development resources in the research and development lab may also be referred to as "lab resources". The term "resources" as used herein refer to the above "lab resources". In addition, the term "software and hardware resources" as used herein refer to hardware, software/firmware lab resources. The hardware, software/firmware lab resources may comprise computing resources, storage resources and the like. As an example, the hardware resources include, but are not limited to: host bus adapters (HBAs), host servers, switches, storage arrays and other components and devices, such as data remote recovery devices (e.g., Recoverpoint by EMC Corporation), virtual storage devices (e.g., VPLEX by EMC Corporation), and wide area network (WAN) optimization devices. The software/firmware resources include, but are not limited to: various types of software/firmware package resources, such as Operating System (OS) installation images, various versions of HBA drivers from various manufacturers, switches, and other hardware components' firmware and software images. In addition, the term "users" as used herein refer to organizations or individuals who are qualified to remotely or locally use the above lab resources, such as business units or employees of business units of an enterprise to which the above lab resources belong, including the lab's external and local business units or employees of business units or persons whom the enterprise authorizes to use.

Collecting unit 101 may utilize various existing resource collecting and acquiring approaches to collect all software and hardware resources available to users. For example, collecting unit 101 may utilize lab resource collecting techniques, such as external management interfaces of different server manufacturers (e.g., IBM's IMM module, Dell's iDRAC card, HP's iLO), information managing and collecting interfaces at the Operating System level (e.g., windows' WMI), and other available resource management standards and protocols defined by the industry standard organization (e.g., Systems Management Architecture for Server Hardware (SMASH) defined by DMTF, etc.).

For another example, collecting unit 101 may utilize automation scripts to inventory all hardware resources within the fabric so as to collect all available hardware resources within the fabric. In addition, collecting unit 101 may further utilize scripts used for retrieving OS/software/firmware installation images from customized locations (e.g., an ftp server or a shared folder) so as to collect software/firmware resources. In addition, collecting unit 101 is further configured to record information associated with the collected resources while collecting all available hardware and software/firmware resources. The information associated with the collected resources may include, but are not limited to: models of HBAs, switches and host servers, types of storage array's front end ports, director setting and logical unit number (LUN) information, and the like. Furthermore, collecting unit 101 is configured to support adding of resources manually to itself.

According to the embodiments of the present disclosure, collecting unit 101 is further configured to maintain at least a part of all software and hardware resources while collecting the all software and hardware available to a user. For example, collecting unit 101 may, while collecting all software and hardware resources available to users, conduct hardware health check, service pack installation, driver and firmware updates, bad component identification, etc. Collecting unit 101 may further generate a maintenance log to record maintenance results, whereby it is convenient to report to resource administrators.

Storing unit 102 is configured to store information associated with the collected resources. Storing unit 102 may comprise a hardware resource repository (not shown) and a software resource repository (not shown). The hardware resource repository stores information associated with the collected hardware resources. The information associated with the collected hardware resources may include, but are not limited to: models of HBAs, switches and host servers, types of storage array's front end ports, director setting and LUN information and the like. The software resource repository stores information associated with the collected software/firmware resources. The information associated with the collected software/firmware resources may include, but are not limited to: OS installation image, various versions of HBA drivers from various vendors, switch and other hardware components' firmware and software images. Further, the information associated with the collected software/firmware resources may include IP addresses for accessing the collected software/firmware resources.

According to the embodiments of the present disclosure, the hardware resource repository and the software resource repository may be implemented using any appropriate technique that is currently known or to be developed in future. For example, the hardware resource repository and the software resource repository each may be implemented as a database, e.g., a relational database or any other type of databases. Alternatively, other implementations of the hardware resource repository and the software resource repository may also feasible. The scope of the present disclosure is not limited in this regard. In one embodiment, information associated with the collected resources may be organized and saved in the hardware resource repository and the software resource repository in a form of tables. Collecting unit 101 may communicate with the hardware resource repository and the software resource repository so as to retrieve therefrom information associated with the collected resources.

Interface unit 103 is configured to present to the user the information associated with the collected resources and receive from the user a resource allocation request. According to the embodiments of the present disclosure, interface unit 103 is configured to, in response to receiving a query request from the user, access storing unit 102 so as to present to the user the information associated with the collected resources as stored in storing unit 102. Alternatively, interface unit 103 may locally save a duplicate of the information stored in storing unit 102 in a given time period (e.g., the last three days); and interface unit 103 is configured to, in response to receiving a query request from the user, present to the user the locally saved information associated with the collected resources.

Interface unit 103 is further configured to receive a resource allocation request from the user. The resource allocation request at least comprises: types of the requested resources; a number of each type of the requested resources; and configuration requirements on each of the requested resources. The configuration requirements on each of the requested resources include, but are not limited to: HBA model, switch model, host server model, storage array model, type of storage array's front end ports (e.g., iSCSI, FC or FCoE), OS version, driver version, LUN requirements (e.g., type and/or size of RAID (redundant array of inexpensive disks), desired LUNs and the like), desired version of firmware/software to be installed on each hardware device, etc. The configuration requirements on each of the requested resources may further comprise a requirement on connection relationship among the requested hardware resources.

According to the embodiments of the present disclosure, interface unit 103 is further configured to, in response to receiving the resource allocation request from the user, access storing unit 102 so as to determine the resources requested by the user. According to the embodiments of the present disclosure, interface unit 103 may access storing unit 102 based on the resource allocation request, so as to find the requested resources from the collected resources and mark the found resources. According to the embodiments of the present disclosure, interface unit 103 is further configured to forward to collecting unit 101 the resource allocation request received from the user.

According to the embodiments of the present disclosure, the resource allocation request further comprises at least one of: an identifier of the user; usage of the requested resources; and a time period in which the requested resources will be used. Since the resource allocation request from the user is sent via interface unit 103, interface unit 103 can track the requested resources, e.g., know which user is using the resources, usage of the resources (e.g., for which project), and when (at what point in time) the resources are to be returned. In addition, interface unit 103 is further configured to track states of the requested resources and present the states of the requested resources to the user. Description will be provided as below to present how interface unit 103 tracks the states of the requested resources.

Configuring unit 104 is configured to allocate the requested resources to the user based on the user's resource allocation request. According to the embodiments of the present disclosure, collecting unit 101 sends a notification message to configuring unit 104 in response to interface unit 103 marking the found resource. The notification message may carry the user's resource allocation request. In response to receiving the notification message, configuring unit 104 configures the marked resources based on the user's resource allocation request. According to the embodiments of the present disclosure, configuring unit 104 is further configured to generate access information for accessing the configured resources and provide the access information to interface unit 103. Interface unit 103 is further configured to provide the access information to the user so as to allocate the configured resources to the user. For example, the access information is an access link.

According to the embodiments of the present disclosure, configuring unit 104 is provided with various scripts that may fulfill the user's configuration requirements on requested resources, including but being not limited to: PXE (pre-boot execution environment) OS deployment and driver installation scripts, scripts to apply the requested firmware/software image onto the requested switch, data remote recovery device and other components, scripts to create the requested LUNs on the storage array, scripts to connect the requested hardware and ports into a fabric through OnPath module, scripts to configure networks and storage zones (VSAN, VLAN, Zone, etc.), scripts for device mapping and masking, etc.

According to the embodiments of the present disclosure, apparatus 100 further comprises a reclaiming unit (not shown) configured to, in response to receiving from collecting unit 101 a notification about expiration of the time period of the allocated resources being used by the user, reclaim the allocated resources from the user and put them back to storing unit 102. Thus, collecting unit 101 may re-mark the allocated resources as "allocatable" in response to the allocated resources being reclaimed.

As described above, interface unit 103 can track states of requested resources and present the states of the requested resources to the user. The states of the requested resources comprise one of the following states: ready for use; in use; ready for reclaim. Configuring unit 104, after initiating the configuration of the requested resources, may send to collecting unit 101 a notification that resource configuration is initiated, and collecting unit 101 may forward the notification to interface unit 103 so that interface unit 103 can track and present to the user the "configuring" state of the requested resources.

Similarly, configuring unit 104, after completing the configuration of the requested resources, may send to collecting unit 101 a notification that resource configuration has been completed, and collecting unit 101 may forward the notification to interface unit 103 so that interface unit 103 may track and present to the user the "ready for use" state of the requested resources. In addition, after allocating a resource to the user, when interface unit 103 receives a query request for the resource from another user, it may present the "in use" state to the other user. Moreover, in response to the incoming expiration of the time period of the allocated resources being used by the user, collecting unit 101 may send a reminder message to the requesting user via interface unit 103. At this point, if interface unit 103 receives a query request for the resource from another user, interface unit 103 may present the "ready for reclaim" state of the requested resource to the another user.

According to the embodiments of the present disclosure, collecting unit 101 is further configured to record information associated with the allocation of requested resources. Apparatus 100 further comprises an analyzing unit (not shown) configured to analyze the recorded information so as to optimize expansion of the collected resources. The analyzing unit may communicate with collecting unit 101 so as to retrieve the recorded information. The analyzing unit may be further configured to analyze information recorded in a predetermined time period so as to determine at least one of: a usage rate of the resources, vacancy windows of the resources, and a shortage rate of the resources.

It should be understood that apparatus 100 described with reference to FIG. 1 may be implemented in various manners. For example, in some embodiments, apparatus 100 may be implemented using software and/or firmware. Alternatively or additionally, apparatus 100 may be implemented partially or completely based on hardware. For example, apparatus 100 may be implemented as an integrated circuit (IC) chip or an application specific integrated circuit (ASIC). Apparatus 100 may also be implemented as a system on chip (SOC). Other manners that are currently known or developed in the future are also feasible, and the scope of the present disclosure is not limited thereto.

Figure 2:
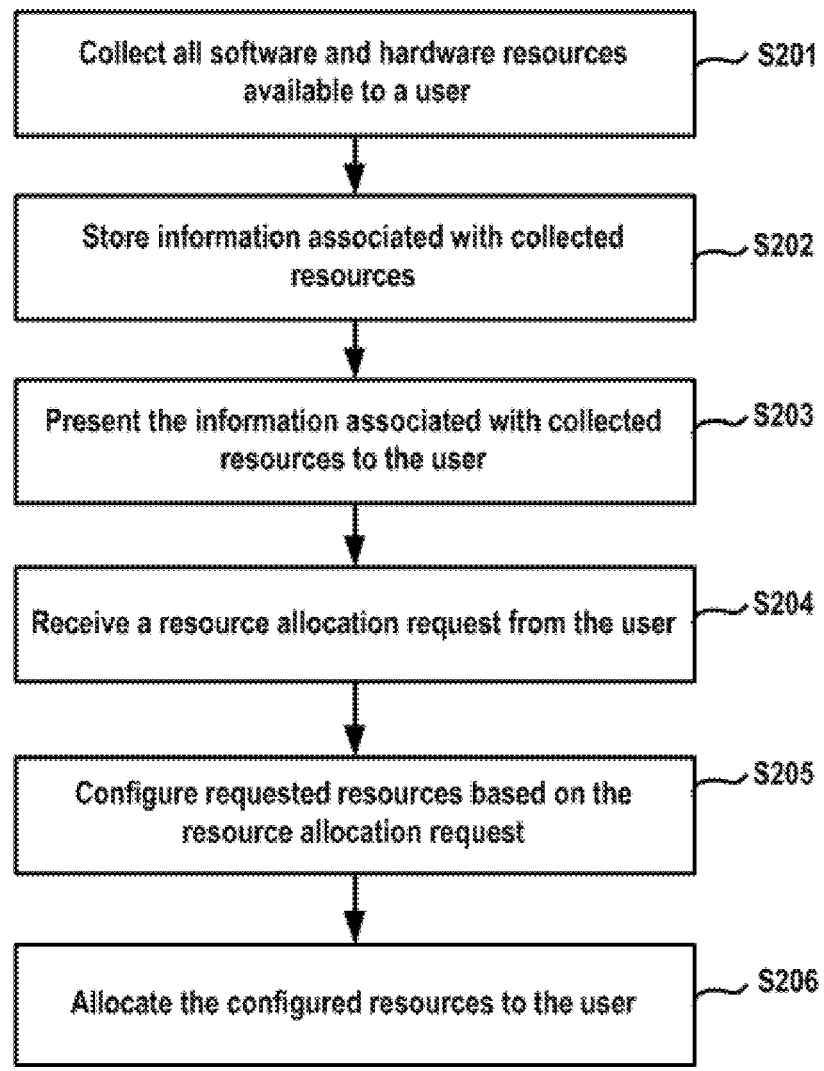
FIG. 2 shows a flowchart of a method 200 for facilitating management of resources according to one exemplary embodiment of the present disclosure.

Next, with reference to FIG. 2, is illustrated an exemplary flowchart of a method 200 for facilitating management of resources according to one embodiment of the present disclosure. It should be understood steps shown in method 200 are merely illustrative. For example, these steps may be executed in different order or even in parallel. In addition, method 200 may also include additional steps, replace some steps or omit some steps.

In step S201, all software and hardware resources available to a user are collected. In step S202, information associated with the collected resources is stored. In step S203, the information associated with the collected resources is presented to the user. In step S204, a resource allocation request is received from the user. In step S205, the requested resources are configured based on the resource allocation request. In step S206, the configured resources are allocated to the user.

According to one embodiment of the present disclosure, method 200 further comprises maintaining at least a part of the all software and hardware resources while collecting all software and hardware resources available to a user.

According to one embodiment of the present disclosure, method 200 further comprises: in response to receiving the resource allocation request from the user, accessing the information associated with the collected resources so as to determine the resources requested by the user.

According to one embodiment of the present disclosure, method 200 further comprises: recording information associated with allocation of the requested resources; and analyzing the recorded information so as to optimize expansion of the collected resources.

According to one embodiment of the present disclosure, analyzing the recorded information comprises: analyzing information recorded in a predetermined time period so as to determine at least one of: a usage rate of the resources, vacancy windows of the resources, and a shortage rate of the resources.

According to some embodiment of the present disclosure, the resource allocation request comprises at least one of: types of the requested resources, a number of each type of the requested resources, and configuration requirements on each of the requested resources.

According to one embodiment of the present disclosure, the resource allocation request further comprises at least one of: an identifier of the user; usage of requested resources; and a time period in which the requested resources will be used.

According to one embodiment, method 200 further comprises: tracking states of the requested resources; and presenting the states of the requested resources to the user.

According to some embodiments, the states of the requested resources comprise at least one of: configuring; ready for use; in use; ready for reclaim.

It should be noted method 200 described with reference to FIG. 2 may be executed by apparatus 100 described with reference to FIG. 1. In particular, various steps in method 200 may be executed by corresponding units in apparatus 100. Therefore, various features described above with reference to apparatus 100 are all applicable to the steps in method 200, which are not detailed here.

Figure 3:
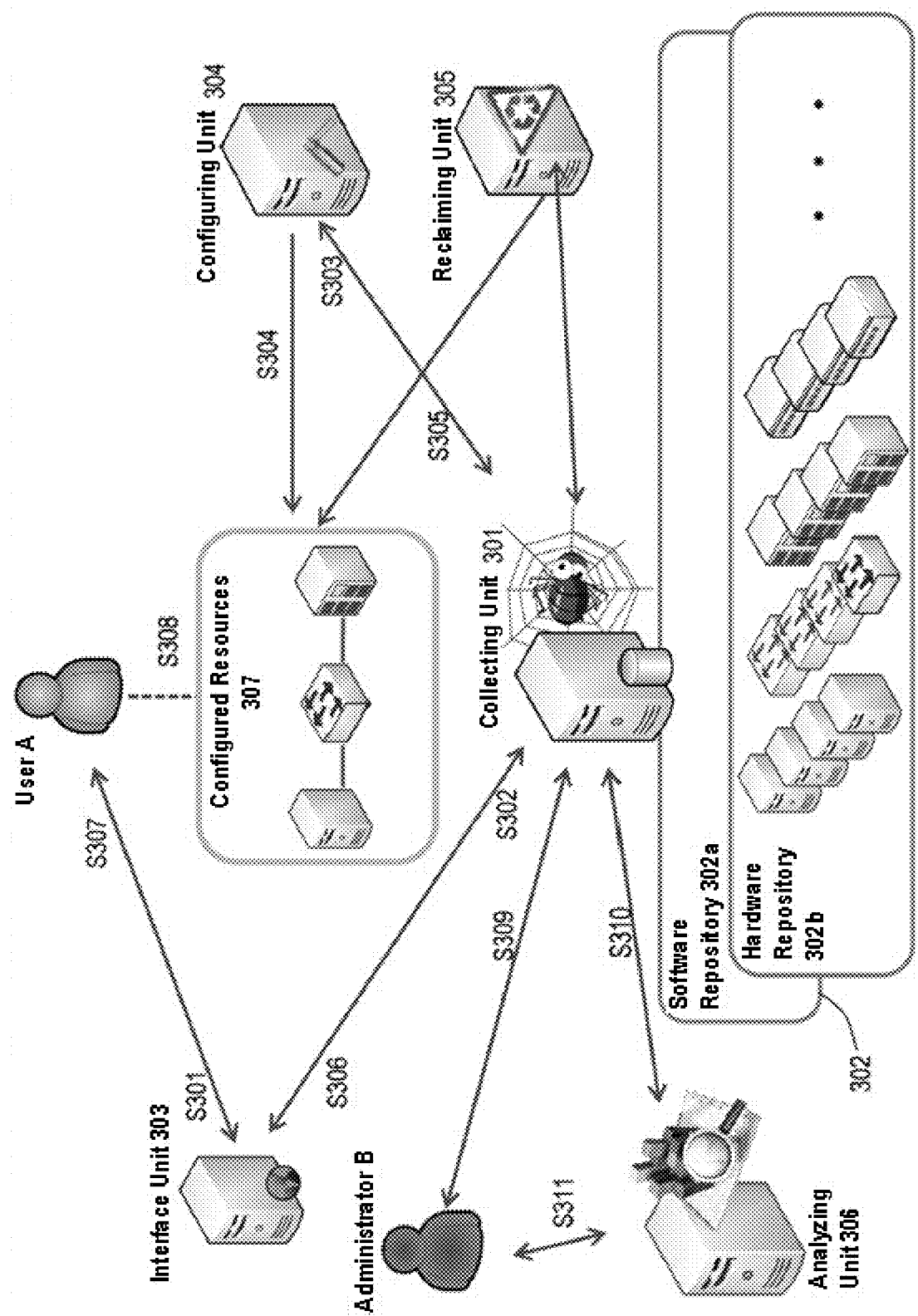
FIG. 3 shows a flowchart of a method for facilitating management of resources according to a specific example of the present disclosure.

With reference to FIG. 3, description is provided to a specific example of a method for facilitating management of resources according to the embodiments of the present disclosure.

In the example shown in FIG. 3, an apparatus for facilitating management of resources comprises: collecting unit 301, storing unit 302, interface unit 303, configuring unit 304, reclaiming unit 305, and analyzing unit 306. Storing unit 302 comprises a software repository 302a and a hardware repository 302b. Various units shown in FIG. 3 and these corresponding units described with reference to FIG. 1 above have the same or similar structures and or execute the same or similar operations, which are thus not detailed here. Further, each of these individual units identified above may be combined into a single facilitating unit (not shown in the Fig.), wherein the facilitating unit is configured to collectively perform the tasks of each of the individual units in an ordered manner to facilitate management of resources.

In the example as shown in FIG. 3, a user A sends a query request to interface unit 303. In response to receiving the query request from user A, interface unit 303 accesses storing unit 302 and thereby presents to user A information (not shown) associated with the collected resources and stored in storing unit 302. In step S301, user A sends a resource allocation request to interface unit 303 based on information presented by the interface unit 303. In step S302, interface unit 303, in response to receiving the resource allocation request, accesses storing unit 302 associated with collecting unit 301 so as to find resources requested by user A. For example, interface unit 303 accesses storing unit 302 based on the resource allocation request, so as to look up the requested resources among the collected resources and then mark the found resources so as to determine the resources requested by user A.

Next in step S303, collecting unit 301, in response to interface unit 303 marking the found resources, sends a notification message to configuring unit 304, the notification message carrying the resource allocation request from user A. In step S304, in response to receiving the notification message, configuring unit 304 configures the marked resources based on the resource allocation request from user A. According to this example, configuring unit 304 further generates access information (e.g., an access link) for accessing the configured resources 307 and sends the access information to collecting unit 301 (step S305). Subsequently in step S306, collecting unit 301 forwards the access information to interface unit 303. In step S307, interface unit 303 may provide the access information to user A by sending an email to user A, for example, so as to allocate the configured resources to user A. Then, user A may use the allocated (configured) resources (step S308).

In step S309, a lab administrator B sends an analysis request to collecting unit 301. In response to receiving the analysis request, collecting unit 301 communicates with storing unit 302 so as to send to analyzing unit 306 information associated with allocation of the requested resources and recorded in storing unit 302 (step S310). The information associated with allocation of the requested resources comprises, for example: resource allocation and release records, etc. The analysis request may specify a time period for analysis, e.g., the last three months, so that information associated with allocation of the requested resources and recorded in storing unit 302 in/at this time period is sent to analyzing unit 306. Analyzing unit 306 may analyze the information recorded in/at this time period so as to determine a usage rate of the resources, vacancy windows of the resources and/or a shortage rate of the resources. Thus, expansion of the collected resources may be optimized. In step S311, analyzing unit 306 reports an analysis result to lad administrator B.

Figure 4:
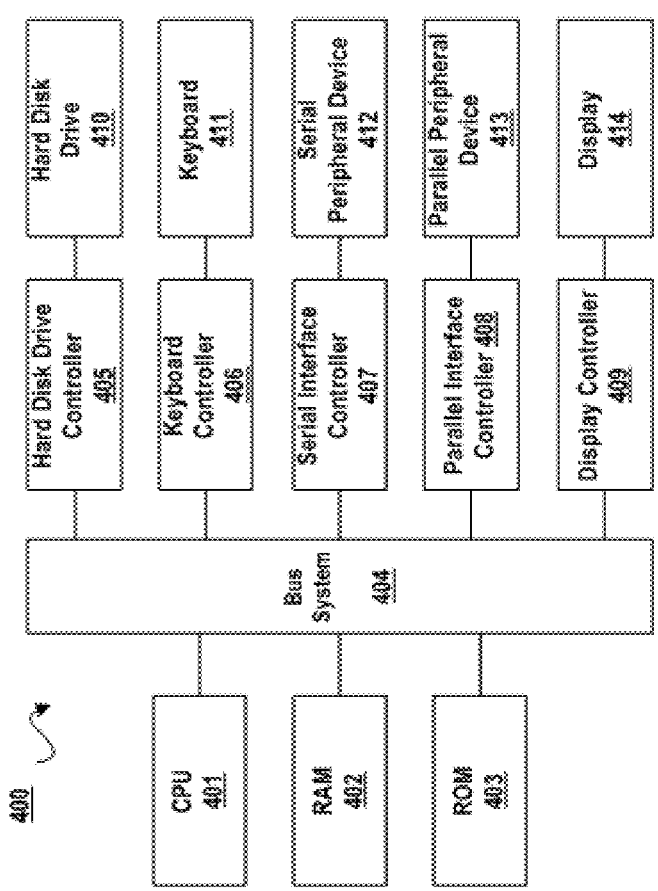
FIG. 4 shows a block diagram of a computer system 400 which is applicable to implement the embodiments of the present disclosure.

Reference is now made to FIG. 4, which illustrates a schematic block diagram of an exemplary computer system 400 that is applicable to implement the embodiments of the present disclosure. For example, computer system 400 shown in FIG. 4 may be used for implementing above-described apparatus 100 for facilitating management of resources.

As shown in FIG. 4, the computer system 400 includes: a CPU (Central Processing Unit) 401, a RAM (Random Access Memory) 402, a ROM (Read Only Memory) 403, a system bus 404, a hard disk drive controller 405, a keyboard controller 406, a serial interface controller 407, a parallel interface controller 408, a display controller 409, a hard disk dive 410, a keyboard 411, a serial peripheral device 412, a parallel peripheral device 413 and a display 414. Among these devices, connected to the system bus 404 are the CPU 401, the RAM 402, the ROM 403, the hard disk dive controller 405, the keyboard controller 406, the serial interface controller 407, the parallel interface controller 408 and the display controller 409. The hard disk drive 410 is coupled to the hard disk drive controller 405; the keyboard 411 is coupled to the keyboard controller 406; the serial peripheral device 412 is coupled to the serial interface controller 407; and the parallel peripheral device 413 is coupled to the parallel interface controller 408; and the display 414 is coupled to the display controller 409. It should be understood that the structural block diagram in FIG. 4 is shown only for illustration purpose, and is not intended to limit the scope of the present disclosure. In some cases, some devices may be added or reduced as required.

As above mentioned, apparatus 100 may be implemented through pure hardware, for example, chip, ASIC, SOC, etc. Such hardware may be integrated into computer system 400. Besides, the embodiments of the present disclosure may also be implemented in a form of a computer program product. For example, method 200 as described with reference to FIG. 2 may be implemented via a computer program product. This computer program product may be stored in RAM 402, ROM 403, hard disk drive 410 and/or any suitable storage medium as illustrated in FIG. 4, or downloaded to computer system 400 from a suitable location in the network. The computer program product may comprise computer code portions comprising program instructions that may be executed through a suitable processing device (for example, CPU 401 as shown in FIG. 4). The program instruction at least may comprise instructions for implementing the steps of method 200.

It should be noted that, the embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a very large scale integrated circuit or gate array, a semiconductor such as logical chip or transistor, or a programmable hardware device such as a field-programmable gate array or a programmable logical device, or implemented by software executed by various types of processors, or implemented by combination of the above hardware circuitry and software such as firmware.

The communication network as mentioned in this specification may comprise various types of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to the embodiments of the present disclosure, the features and functions of two or more units above described may be embodied in one unit. On the contrary, the features and functions of one unit above described may be further partitioned to be embodied in more units.

Besides, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. An apparatus for facilitating management of resources, comprising:
a facilitating unit configured to
collect software and hardware resources at least in part by running a set of automation scripts that inventory the software and hardware resources, wherein a portion of the software and hardware resources are available to a user, wherein, while collecting the available portion of software and hardware resources, the facilitating unit is further configured to perform resource maintenance operations to check hardware health and to identify bad components;
store information associated with the collected resources;
present the information associated with the collected resources to the user, wherein the information is enabled to include vacancy windows of the collected resources;
receive a resource allocation request from the user;
configure the requested resources based on the resource allocation request;
transmit access information to the user to allow the user to access the configured resources;
allocate the configured resources to the user;
in response to receiving from a notification about expiration of a time period of the allocated resources being used by the user, reclaim the allocated resources from the user;
record information associated with allocation of the requested resources, the information including (i) models of host bus adapters (HBAs), (ii) array front-end ports, and (iii) logical unit number (LUN) information; and
analyze the recorded information to optimize expansion of the collected resources.

2. The apparatus according to claim 1, further configured to determine the resources requested by the user in response to receiving the resource allocation request from the user.

3. The apparatus according to claim 1, further configured to analyze the information recorded in a predetermined time period so as to determine at least one of:
a usage rate of the resources;
vacancy windows of the resources; and
a shortage rate of the resources.

4. The apparatus according to claim 3, wherein the resource allocation request comprises at least one of:
types of the requested resources;
a number of each type of the requested resources; and
configuration requirements on each of the requested resources.

5. The apparatus according to claim 4, wherein the resource allocation request further comprises at least one of:
an identifier of the user;
usage of the requested resources; and
a time period in which the requested resources will be used.

6. The apparatus according to claim 5, further configured to:
track states of the requested resources; and
present the states of the requested resources to the user.

7. The apparatus according to claim 6, wherein the states of the requested resources comprises one of:
configuring;
ready for use;
in use; and
ready for reclaim.

8. The apparatus of claim 1, wherein the facilitating unit, configured to reclaim the allocated resources, is further configured to mark the allocated resources that have been reclaimed as allocatable.

9. The apparatus of claim 1, wherein performing the resource maintenance operations while collecting the available portion of software and hardware resources includes:
generating a maintenance log to record maintenance results, and
reporting the maintenance results to one or more resource administrators.

10. The apparatus of claim 9, wherein, while collecting the available portion of software and hardware resources, running the set of automation scripts includes running a script to retrieve a software installation image from a specified location.

11. The apparatus of claim 10, wherein, while collecting the available portion of software and hardware resources, performing the resource maintenance operations further includes performing at least one of (i) a service pack installation, (ii) a driver update, and (iii) a firmware update.

12. The apparatus of claim 1, wherein the facilitating unit is further configured to configure the requested resources based on the resource allocation request, including running scripts to create requested LUNs on a storage array, to create zones, and to map LUNs for establishing the resources of a research and development lab.

13. A method for facilitating management of resources, comprising:
collecting software resources and hardware resources at least in part by running a set of automation scripts that inventory the software and hardware resources, wherein a portion of the software resources and the hardware resources are available to a user, wherein, while collecting the available portion of software and hardware resources, the method further includes performing resource maintenance operations to check hardware health and to identify bad components;
storing information associated with the collected resources;
presenting the information associated with the collected resources to the user, wherein the information is enabled to include vacancy windows of the collected resources;
receiving a resource allocation request from the user;
configuring requested resources based on the resource allocation request;
transmitting access information to the user to allow the user to access the configured resources;
allocating the configured resources to the user;
in response to receiving from a notification about expiration of a time period of the allocated resources being used by the user, reclaiming the allocated resources from the user;
recording information associated with allocation of the requested resources, the information including (i) models of host bus adapters (HBAs), (ii) array front-end ports, and (iii) logical unit number (LUN) information; and analyzing the recorded information to optimize expansion of the collected resources.

14. The method according to claim 13, further comprising:

in response to receiving the resource allocation request from the user, accessing the information associated with the collected resources so as to determine the resources requested by the user.

15. The method according to claim 13, wherein analyzing the recorded information comprises analyzing the information recorded in a predetermined time period to determine at least one of:

a usage rate of the resources;
vacancy windows of the resources; and
a shortage rate of the resources.

16. The method according to claim 15, wherein the resource allocation request comprises at least one of:

types of the requested resources;
a number of each type of the requested resources; and
configuration requirements on each of the requested resources.

17. The method according to claim 16, wherein the resource allocation request further comprises at least one of:

an identifier of the user;
usage of the requested resources; and
a time period in which the requested resources will be used.

18. The method according to claim 17, further comprising:

tracking states of the requested resources; and
presenting the states of the requested resources to the user.

19. The method according to claim 18, wherein the states of the requested resources comprises at least one of:

configuring;
ready for use;
in use; and
ready for reclaim.

20. A computer program product for facilitating management of resources, the computer program product being tangibly stored on a non-transitory computer-readable storage medium and comprising machine executable instructions which, when executed, cause the machine to:

collect software resources and hardware resources at least in part by running a set of automation scripts that inventory the software and hardware resources, wherein a portion of the software resources and hardware resources are available to a user, wherein collecting the available portion of software and hardware resources includes performing resource maintenance operations to check hardware health and to identify bad components;

store information associated with the collected resources;

present the information associated with the collected resources to the user, wherein the information is enabled to include vacancy windows of the collected resources;

receive a resource allocation request from the user;

configure requested resources based on the resource allocation request;

transmit access information to the user to allow the user to access the configured resources;

allocate the configured resources to the user;

in response to receiving from a notification about expiration of a time period of the allocated resources being used by the user, reclaim the allocated resources from the user;

record information associated with allocation of the requested resources, the information including (i) models of host bus adapters (HBAs), (ii) array front-end ports, and (iii) logical unit number (LUN) information; and analyze the recorded information to optimize expansion of the collected resources.

* * * * *